(12) United States Patent
Farooq et al.

(10) Patent No.: US 10,525,928 B2
(45) Date of Patent: Jan. 7, 2020

(54) DEPLOYABLE PANEL FOR PEDESTRIAN IMPACT

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Nirmal Muralidharan, Birmingham, MI (US); Srinivasan Sundararajan, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 154 days.

(21) Appl. No.: 15/915,666

(22) Filed: Mar. 8, 2018

(65) Prior Publication Data

US 2019/0275981 A1 Sep. 12, 2019

(51) Int. Cl.
*B60R 21/34* (2011.01)
*B60R 19/40* (2006.01)
*B60R 21/00* (2006.01)

(52) U.S. Cl.
CPC ............ *B60R 21/34* (2013.01); *B60R 19/40* (2013.01); *B60R 2021/0053* (2013.01)

(58) Field of Classification Search
CPC .. B60R 21/34; B60R 19/40; B60R 2021/0053
USPC ................ 180/271, 274; 296/187.04, 187.09
See application file for complete search history.

(56) References Cited

U.S. PATENT DOCUMENTS

| 6,089,628 A | * | 7/2000 | Schuster | B60R 19/12 293/118 |
|---|---|---|---|---|
| 7,836,996 B2 | | 11/2010 | Kitte et al. | |
| 8,764,079 B1 | | 7/2014 | Kim et al. | |
| 9,205,803 B2 | | 12/2015 | Farooq et al. | |
| 9,573,560 B1 | * | 2/2017 | Narita | B60R 21/38 |
| 2009/0223360 A1 | * | 9/2009 | Aoki | B60R 21/38 92/15 |
| 2011/0042975 A1 | * | 2/2011 | Faruque | B60R 19/28 293/118 |
| 2016/0130842 A1 | * | 5/2016 | Ferri | E05B 77/08 292/92 |

FOREIGN PATENT DOCUMENTS

| CN | 201914204 U | 8/2011 |
|---|---|---|
| CN | 103832387 A | 6/2014 |
| DE | 102009021281 A1 | 11/2010 |
| GB | 2394920 B | 9/2005 |

* cited by examiner

*Primary Examiner* — Toan C To
(74) *Attorney, Agent, or Firm* — Frank A. MacKenzie; Bejin Bieneman PLC (57) ABSTRACT

A system includes a bumper, an actuator fixed to the bumper, and a panel fixed to the actuator and moveable relative to the bumper. A first bracket is fixed to one of the bumper and the panel, and a second bracket is fixed to the other of the bumper and the panel. The second bracket is moveably engaged with the first bracket. A spring-loaded lock is fixed to the first bracket and is biased against the second bracket. The actuator may be triggered in response to a sensed pedestrian impact. In that case, the actuator moves the first and second brackets relative to each other to move the panel from a recessed position to an extended position.

18 Claims, 6 Drawing Sheets

DEPLOYABLE PANEL FOR PEDESTRIAN IMPACT

BACKGROUND

The Global Technology Regulation (GTR) and the New Car Assessment Program (NCAP) specify leg-injury criteria for pedestrian protection. The regulations are aimed at reducing the impact force to the legs of a pedestrian by a vehicle bumper during a vehicle-pedestrian impact.

Some vehicles, such as light duty trucks and sport utility vehicles (SUVs), for example, may have a relatively high bumper height that could lead to an uneven impact on the femur and/or tibia of the pedestrian by the vehicle bumper during the vehicle-pedestrian impact. For example, light duty trucks may have relatively high bumper heights to provide ground clearance to clear speed bumps, curbs, parking blocks, inclined driveway ramps, hills, rough roads, etc. Some vehicles that have relative high bumper heights also have off-road capabilities that preclude having any components below the bumper. As such, there is an opportunity to design a vehicle front-end for pedestrian leg impact energy management while addressing ground clearance requirements.

DETAILED DESCRIPTION

A system includes a bumper. An actuator is fixed to the bumper. A panel is fixed to the actuator and moveable relative to the bumper. A first bracket is fixed to one of the bumper and the panel. A second bracket is fixed to the other of the bumper and the panel and is moveably engaged with the first bracket. A spring-loaded lock is fixed to the first bracket and biased against the second bracket.

The spring-loaded lock may include a spring fixed to the first bracket and a post between the spring and the second bracket. The post slideably contacts the second bracket.

The spring may be a leaf spring.

The second bracket may have a notch spaced from the post and sized to receive the post.

The first bracket and the second bracket may be moveable relative to each other along an axis. The post and the notch may be spaced from each other along the axis.

The first bracket and the second bracket may be moveable relative to each other to a locked position. The post may extend into the notch and prevent relative movement between the first and second bracket when the first and second bracket are in the locked position.

The second bracket may have a notch spaced from the spring-loaded lock and sized to receive the spring-loaded lock.

The first bracket and the second bracket are moveable relative to each other along an axis. The spring-loaded lock and the notch are spaced from each other along the axis.

The first bracket and the second bracket are moveable relative to each other to a locked position. The spring-loaded lock may extend into the notch and prevent relative movement between the first and second bracket when the first and second bracket are in the locked position.

One of the first bracket and the second bracket may be tubular and slideably house the other of the first bracket and the second bracket.

The second bracket may have a notch spaced from the spring-loaded lock and sized to receive the spring-loaded lock.

Each of the first bracket and the second bracket may have a track. Each track receives each other.

One of the first bracket and the second bracket may have a slot that receives the other of the first bracket and the second bracket.

The actuator may be a pyrotechnic actuator.

The actuator may include a piston and a housing that moveably receives the piston. The housing may be fixed to one of the bumper and the panel, and the piston may be fixed to the other of the bumper and the panel.

The system may include a first locking device. The first locking device includes the first bracket, the second bracket, and the spring-loaded lock. The system may include a second locking device fixed to the bumper and the panel and spaced from the first locking device. The actuator being between the first locking device and the second locking device.

The second locking device may be identical to the first locking device.

The bumper and the panel may each include a vehicle-outward face, and the vehicle-outward face of the panel is recessed relative to the vehicle-outward face of the bumper.

With reference to the Figures, wherein like numerals indicate like parts throughout the several views, a system 10 for a vehicle 12 includes a bumper 14. An actuator 16 is fixed to the bumper 14. A panel 18 is fixed to the actuator 16 and is moveable relative to the bumper 14. A first bracket 20 is fixed to one of the bumper 14 and the panel 18, and a second bracket 22 is fixed to the other of the bumper 14 and the panel 18. The second bracket 22 is moveably engaged with the first bracket 20. A spring-loaded lock 24 is fixed to the first bracket 20 and is biased against the second bracket 22.

Figure 1:
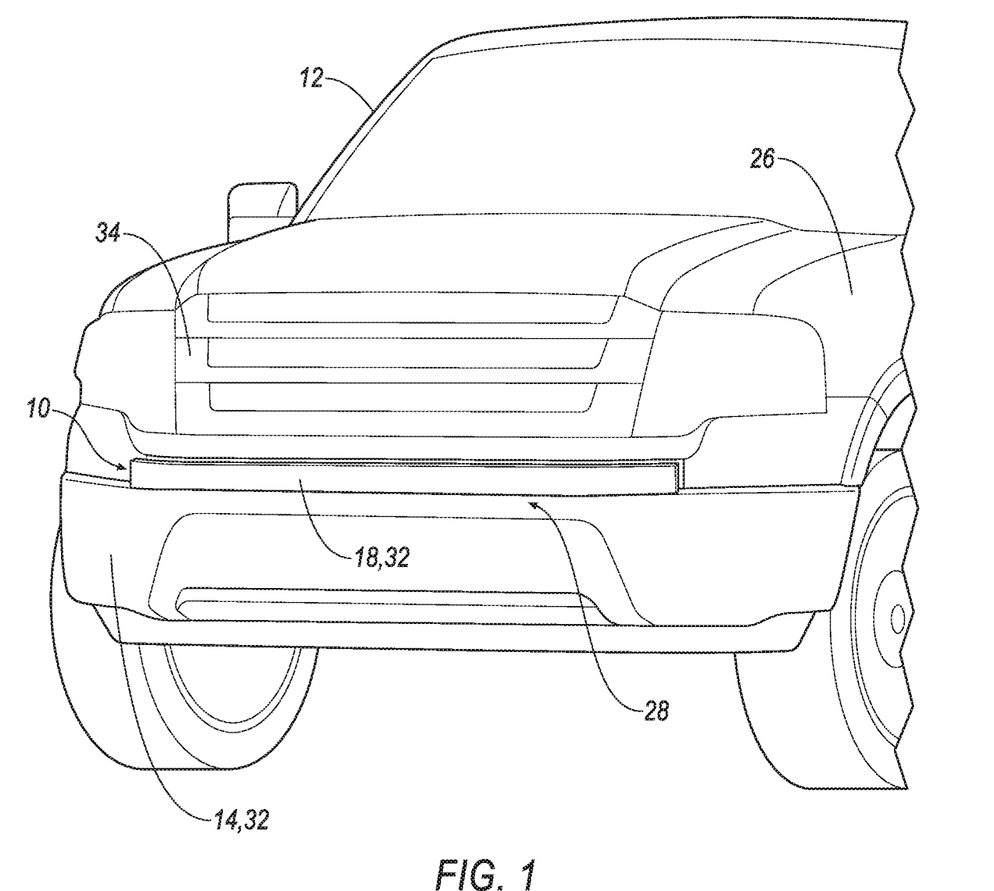
FIG. 1 is a perspective view of a vehicle with a deployable panel in a recessed position.
Figure 2:
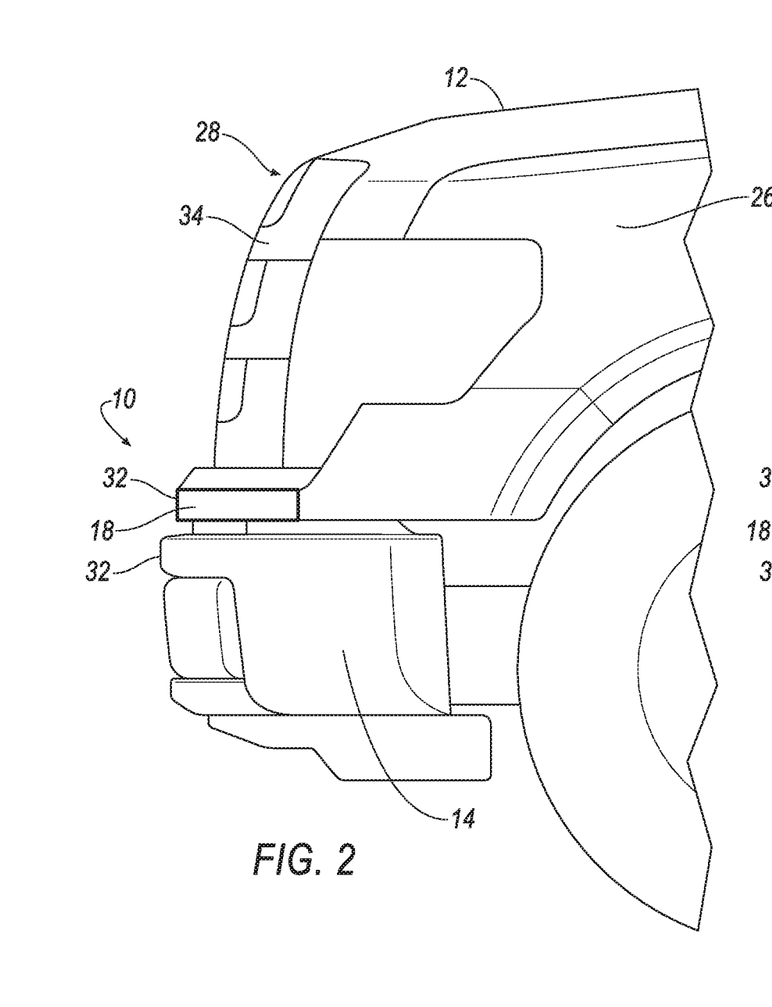
FIG. 2 is a side view of a front end of the vehicle including the deployable panel in the recessed position.
Figure 3:
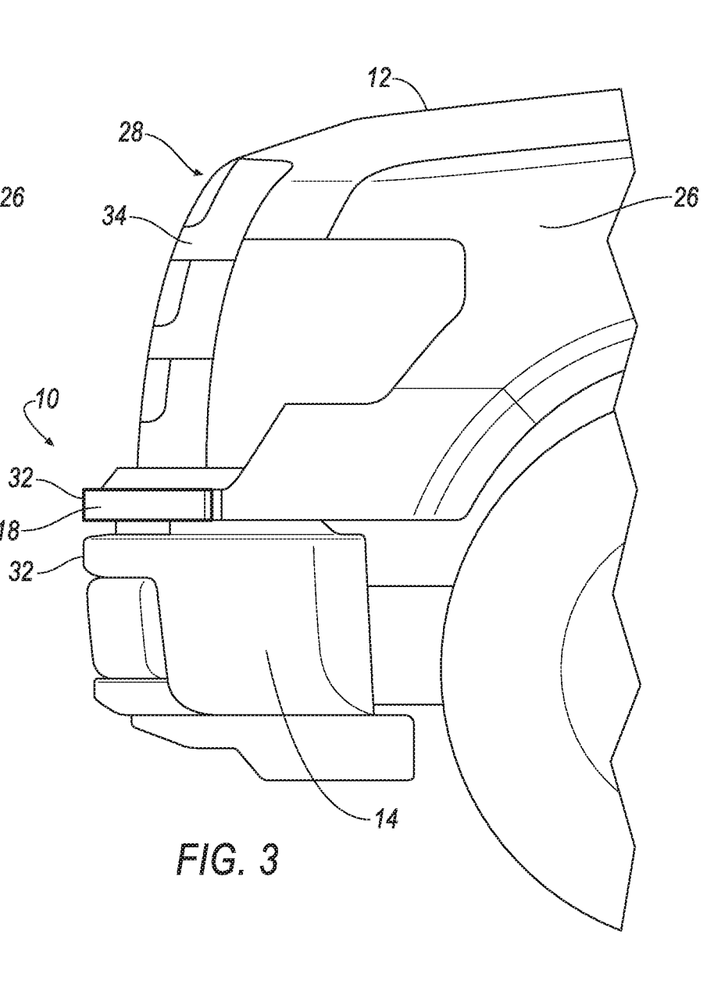
FIG. 3 is a side view of the front end of the vehicle including the deployable panel in an extended position.
Figure 4:
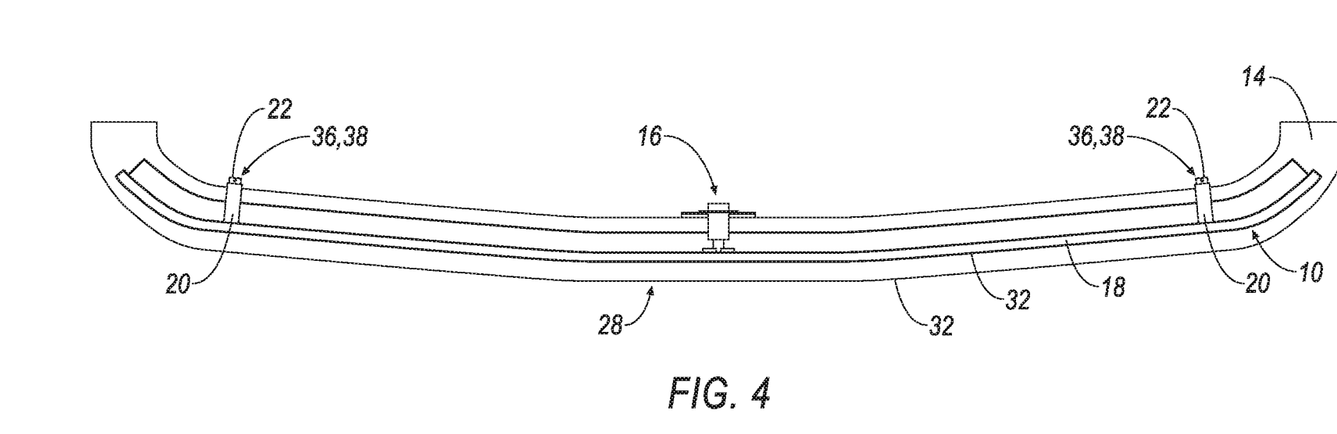
FIG. 4 is a top view of a bumper and a system including the deployable panel in the recessed position.
Figure 5:
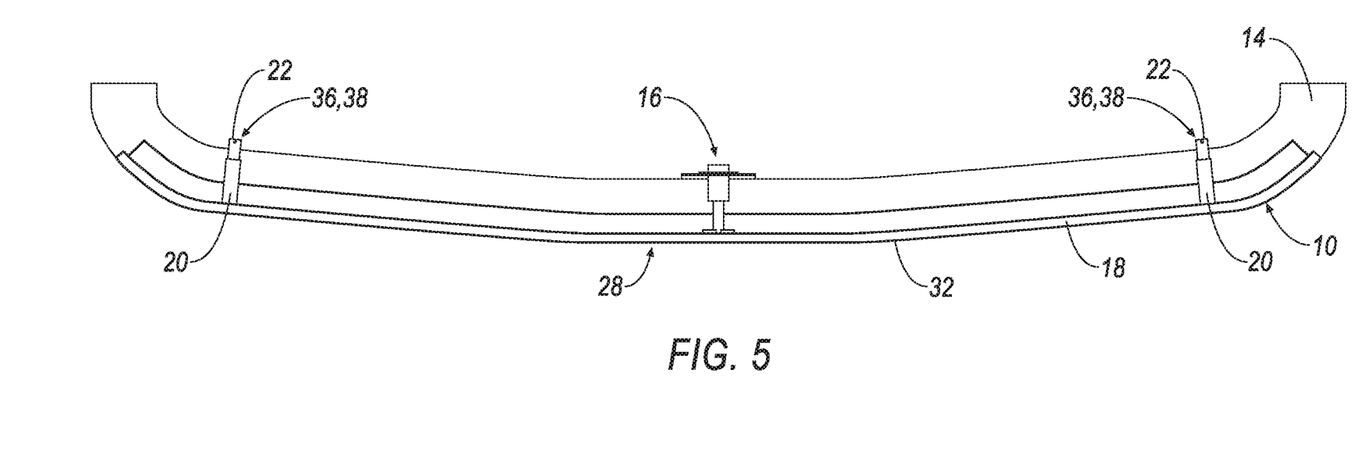
FIG. 5 is the top view of FIG. 4 with the deployable panel in the extended position.

The panel 18 may move from a recessed position, as shown in FIGS. 2 and 4, to an extended position, as shown in FIGS. 1, 3, and 5, in response to a front impact of the vehicle 12 with a pedestrian, as described further below. The panel 18 in the recessed position maintains a desired styling for a front end 28 of the vehicle 12. During a front impact of the vehicle 12 with a pedestrian, the actuator 16 moves the panel 18 in a vehicle-forward direction to the extended position to maintain relative positioning of the pedestrian's femur and tibia during the front vehicle impact and reduce the high load transmission to the pedestrian's knee. In other words, the panel 18 in the extended position is positioned to prevent uneven loading and/or relative movement of the femur relative to the tibia. As set forth further below, the spring-loaded lock 24 locks the first bracket 20 and the second bracket 22 relative to each other to maintain the panel 18 in the extended position during impact with the pedestrian.

The vehicle 12 may be an autonomous vehicle and/or a semi-autonomous vehicle. The vehicle 12 may include a computer configured to operate the vehicle 12 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

With reference to FIG. 1, the vehicle 12 includes a frame 26. The frame 26 may be of any suitable construction, e.g. unibody construction, body-on-frame construction, or of any other suitable construction. The frame 26 may be formed of any suitable material, for example, steel, aluminum, etc.

With reference to FIGS. 1, 2 and 3, the system 10 includes the bumper 14 fixed to the frame 26. The system 10 may be disposed at a front end 28 of the vehicle 12, as shown in FIG. 1. As another example, the system 10 may be disposed at a rear end (not shown) of the vehicle 12. With reference to FIGS. 1, 4 and 5, the bumper 14 may be elongated in a cross-vehicle direction. The bumper 14 may have a vehicle-outward face 32. The bumper 14 may be formed of any suitable material, for example, steel, aluminum, etc. The vehicle-outward face 32 of the bumper 14 may present a class-A surface, i.e., a surface specifically manufactured to have a high-quality, finished aesthetic appearance free of blemishes.

With reference to FIGS. 2 and 4, in the recessed position, the panel 18 may be recessed relative to the vehicle-outward face 32 of the bumper 14. With reference to FIGS. 1, 3 and 5, the panel 18 in the extended position is aligned with the vehicle-outward face 32 of the bumper 14 in the vehicle-forward direction to minimize the possibility of an uneven impact on the femur and/or tibia of the pedestrian. In other words, the panel 18 in the extended position, as shown in FIGS. 1, 3, and 5, is aligned with the bumper 14 to create an increased impact surface area at the front end 28 of the vehicle 12 in a vehicle impact. In this position, the panel 18 aligns with the bumper 14 to form the increased impact surface that may reduce injury to the pedestrian's knee and ACL (Anterior Cruciate Ligament).

With reference to FIGS. 1-5, the system 10 includes the panel 18. The panel 18 may include a vehicle-outward face 32. With further reference to FIGS. 1-5, the panel 18 may be elongated in a cross-vehicle direction. The panel 18 may be above the bumper 14. The panel 18 may be formed of any suitable material, including plastic, such as injection-molded plastic; metal, such as aluminum or steel; or any other suitable material. The vehicle-outward face 32 of the bumper 14 may present a class-A surface, i.e., a surface specifically manufactured to have a high-quality, finished aesthetic appearance free of blemishes.

The panel 18 is fixed to the actuator 16 and the panel 18 is moveable relative to the bumper 14. As previously mentioned and as shown in FIGS. 2 and 4, when the panel 18 is in the recessed position, the panel 18 is recessed relative to the vehicle-outward face 32 of the bumper 14. More specifically, the vehicle-outward face 32 of the panel 18 is recessed relative to the vehicle-outward face 32 of the bumper 14. As shown in FIGS. 3 and 5, when the panel 18 is in the extended position, the vehicle-outward face 32 of the panel 18 is aligned with the vehicle-outward face 32 of the bumper 14.

With reference to FIG. 1, the vehicle 12 may include a grille 34. The grille 34 is above the panel 18 and the panel 18 is between the grille 34 and the bumper 14. The grille 34 may be separate from the panel 18, and the panel 18 may move relative to the grille 34 from the recessed position to the extended position. As another example, the grille 34 may be fixed to the panel 18, and may move with the panel 18 from the recessed position to the extended position. In such an example, the grille 34 may be separately formed from the panel 18 and subsequently assembled to the panel 18, or may be unitary with the panel 18, i.e., the grille 34 and the panel 18 are single, uniform piece of material with no seams, joints, fasteners, or adhesives holding them together. The grille 34 may be formed of any suitable material, including plastic, such as injection-molded plastic; metal, such as aluminum or steel; or any other suitable material.

With reference to FIGS. 4 and 5, the system 10 includes at least one locking device 36, 38, e.g., a first locking device 36 and a second locking device 38. The second locking device 38 may be identical to the first locking device 36, as shown in FIGS. 4 and 5. As another example, the second locking device 38 may be different than the first locking device 36. The system 10 shown in the figures includes two locking devices 36, 38, i.e., the first locking device 36 and the second locking device 38. In such an example, the first locking device 36 and the second locking device 38 are spaced from each other, and the actuator 16 is between the first locking device 36 and the second locking device 38. Alternatively, the system 10 may include any suitable number of locking devices 36, 38, i.e., one or more. The adjectives "first," "second," etc. are used with respect to the locking devices 36, 38 merely as identifiers and do not indicate order or importance.

The locking device 36, 38 includes the first bracket 20 that is fixed to one of the bumper 14 and the panel 18, i.e., the first bracket 20 is immovably connected, directly or indirectly through an intermediate component, to one of the bumper 14 and the panel 18. The locking device 36, 38 includes the second bracket 22 that is fixed to the other of the bumper 14 and the panel 18, i.e., the second bracket 22 is immovably connected, directly or indirectly through an intermediate component, to the other of the bumper 14 and the panel 18. As an example shown in the figures, the first bracket 20 is fixed to the panel 18 and the second bracket 22 is fixed to the bumper 14.

The first bracket 20 and the second bracket 22 may be fixed to the respective one of the bumper 14 and the panel 18 in any suitable fashion, e.g., with fasteners, welding, etc. The first bracket 20 and the second bracket 22 may be formed of the same or different types of material, and may be of any suitable type of material, e.g., a rigid polymer, a metal, composite, etc.

Figure 8:
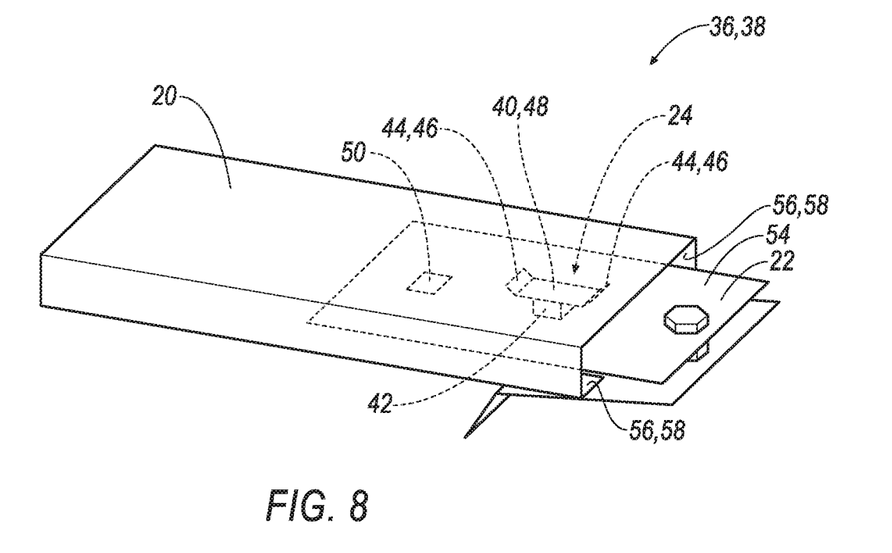
FIG. 8 is a perspective view of a locking device in an unlocked position.
Figure 9:
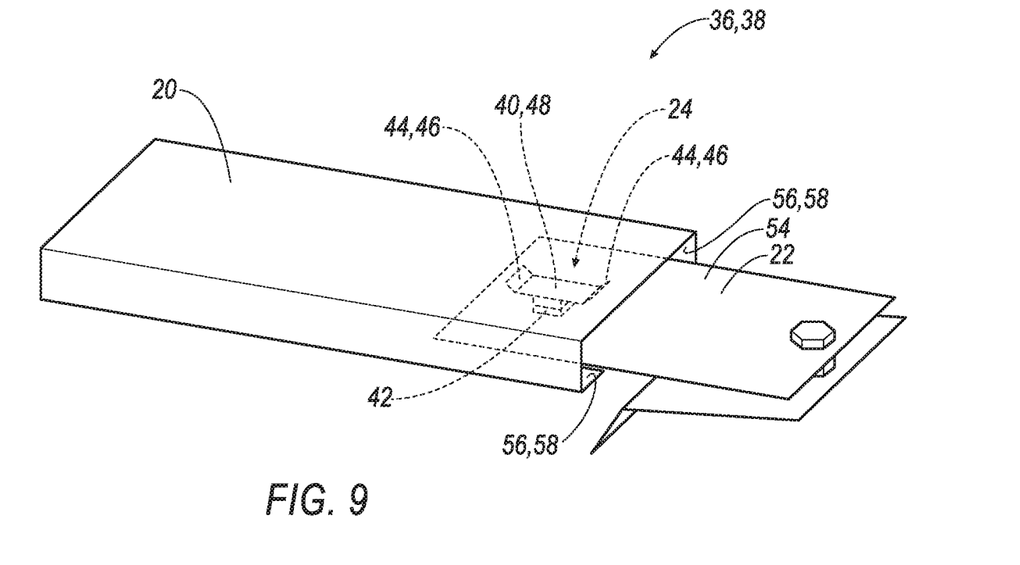
FIG. 9 is a perspective view of the locking device in a locked position.
Figure 10:
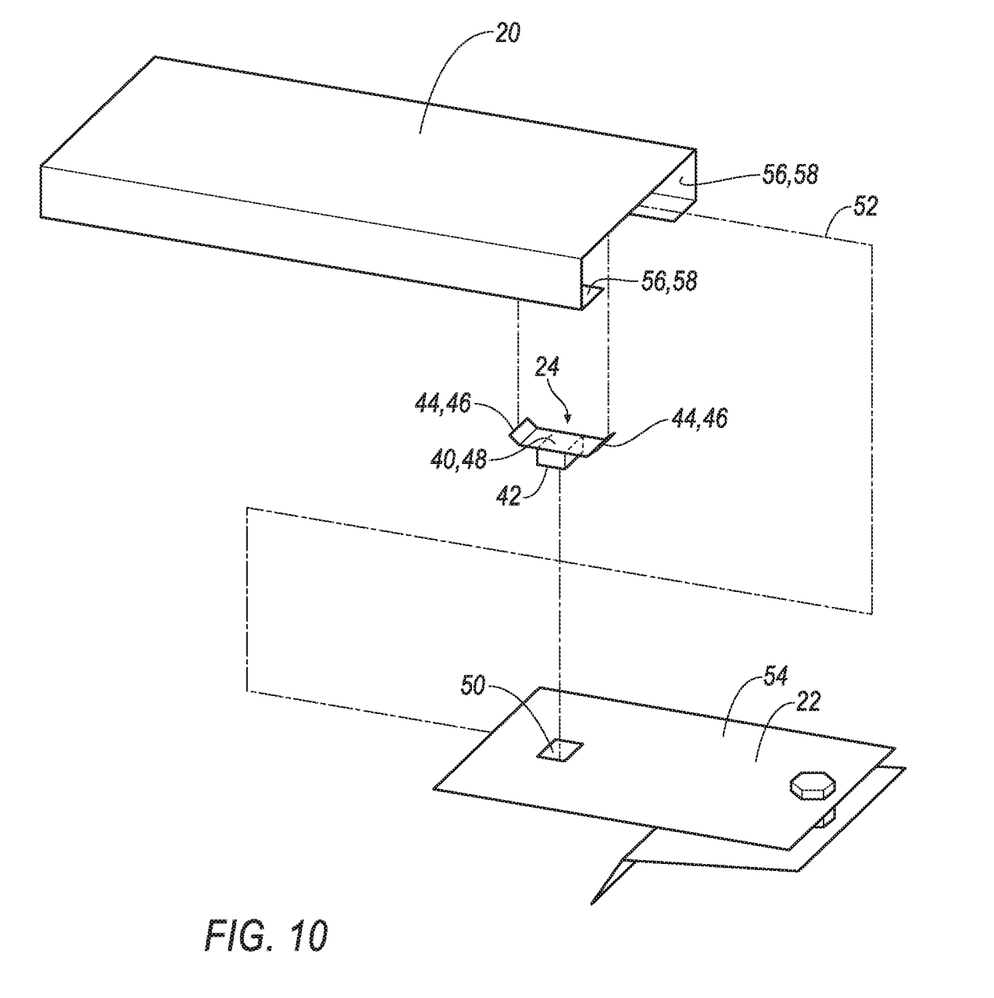
FIG. 10 is an exploded view of the locking device.

With reference to FIGS. 8-10, the second bracket 22 is movably engaged with the first bracket 20. The second bracket 22 is moveable relative to the first bracket 20 between an unlocked position, shown in FIG. 8, and a locked position, shown in FIG. 9.

The locking device 36, 38 includes the spring-loaded lock 24 that is fixed to the first bracket 20 and biased against the second bracket 22. With reference to FIGS. 8-10, the spring-loaded lock 24 includes a spring 40 and a post 42. The spring 40 is fixed to the first bracket 20 and is biased against the second bracket 22. The spring 40 has a first end 44 and a second end 46. As an example and with further reference to FIGS. 8-10, the spring 40 may be a leaf spring 40 with the first end 44 and the second end 46, each fixed to the first bracket 20. In other words, the first end 44 and the second end 46 of the leaf spring 40 are immovably attached to the first bracket 20. The leaf spring 40 may include an elongated portion 48 between the first end 44 and the second end 46, and the elongated portion 48 is spaced from the first bracket 20 and biased toward the second bracket 22. As another example, the spring 40 may be a coil spring with the first end 44 fixed to the first bracket 20 and the second end 46 biased toward the second bracket 22. Alternatively, the spring 40 may be any suitable kind of spring. The spring 40 may be formed of metal, e.g., steel or aluminum, and the spring 40 may be fixed to the first bracket 20 in any suitable fashion, e.g., with fasteners, welding, bonding, etc.

With reference to FIGS. 8-10, the spring-loaded lock 24 includes the post 42. The post 42 may be made of any suitable material, e.g., plastic or rubber and be of any suitable shape, such as a knob.

The post 42 is fixed to the spring 40. The post 42 is between the spring 40 and the second bracket 22 and slideably contacts the second bracket 22. The spring 40 is configured to bias the post 42 against the second bracket 22. In the example where the spring 40 is a leaf spring 40, the post 42 may be fixed to the elongated portion 48 of the leaf spring 40, as shown in FIGS. 8-10. In the example where the spring 40 is a coil spring (not shown), the post 42 may be fixed to the second end 46 of the coil spring.

With reference to FIGS. 8-10, the second bracket 22 may have a notch 50. As one example, as shown in FIG. 10, the notch 50 may extend through the second bracket 22. As another example, the notch 50 be a groove in the second bracket 22. The notch 50 may be spaced from the spring-loaded lock 24 and sized to receive the spring-loaded lock 24. Additionally and/or in the alternative, the notch 50 may be spaced from the post 42 and may be sized to receive the post 42.

The locking device 36, 38 includes an axis 52. The first bracket 20 and the second bracket 22 are elongated along the axis 52.

With reference to FIG. 8, in the unlocked position, the first bracket 20 and the second bracket 22 are moveable relative to each other along the axis 52 from the unlocked position to the locked position. The spring-loaded lock 24 and the notch 50 are spaced from each other along the axis 52. In the event the actuator 16 moves the first bracket 20 and the second bracket 22 relative to each other along the axis 52 toward the locked position, the spring-loaded lock 24 slides along the second bracket 22 and extends into the notch 50 when the notch 50 is aligned with the spring-loaded lock 24 along the axis 52. In the locked position, the spring-loaded lock 24 extends into the notch 50 and prevents the first bracket 20 and the second bracket 22 from being moveable relative to each other along the axis 52.

As set forth above, the second bracket 22 is moveably engaged with the first bracket 20. Specifically, the second bracket 22 may include an inner surface 54 facing the first bracket 20, and the inner surface 54 is moveably engaged with the first bracket 20. The inner surface 54 of the second bracket 22 may be slideably engaged with the first bracket 20.

One of the first bracket 20 and the second bracket 22 may have a track 56, and the other of the first bracket 20 and the second bracket 22 may be engaged with the track 56. For example, with reference to FIGS. 8-10, one of the first bracket 20 and the second bracket 22 may have a slot 58 that receives the other of the first bracket 20 and the second bracket 22. For example, with reference to FIGS. 8-10, the first bracket 20 has the slot 58 that receives the second bracket 22. As another example of the track 56, one of the first bracket 20 and the second bracket 22 may be tubular and may slideably house the other of the first bracket 20 and the second bracket 22

With reference to FIGS. 4 and 5, the actuator 16 is positioned to move the panel 18 relative to the bumper 14 from the recessed position to the extended position.

Figure 6:
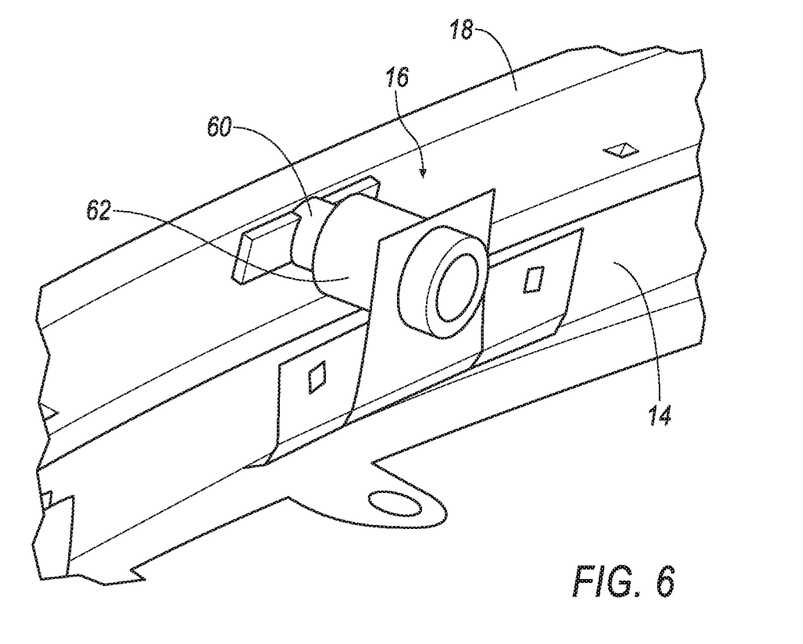
FIG. 6 is a perspective view of a portion of the bumper and the deployable panel, and an actuator in an undeployed position.
Figure 7:
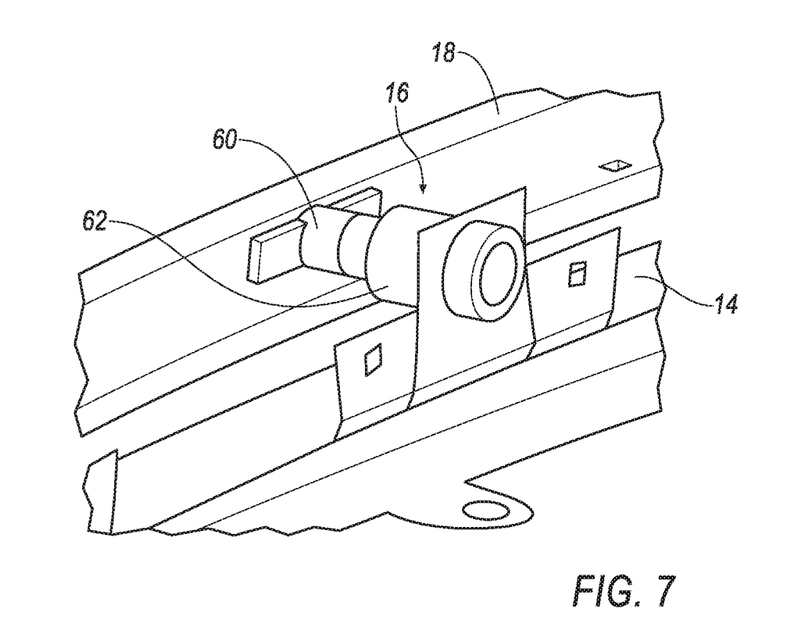
FIG. 7 is the perspective view of FIG. 6 with the actuator in a deployed position

The actuator 16 may include a piston 60 and a housing 62 that moveably receives the piston 60. With reference to FIGS. 4 and 5, the actuator 16 is fixed to the panel 18 and the bumper 14, i.e., the actuator 16 is immovably connected, directly or indirectly through an intermediate component, to the panel 18 and the bumper 14. More specifically, the piston 60 is fixed to one of the bumper 14 and the panel 18 and the housing 62 is fixed to the other of the bumper 14 and housing 62. As an example, and as shown in FIGS. 6 and 7, the housing 62 is fixed to the bumper 14 and the piston 60 is fixed to the panel 18. The actuator 16 may be fixed to the panel 18 and the bumper 14 in any suitable fashion, e.g., with fasteners, mounting features, etc.

The actuator 16 may be a pyrotechnic actuator. The pyrotechnic actuator 16 may include a pyrotechnic charge (not shown), and an electrical ignition device (not shown). In such an example, the pyrotechnic charge may be ignited to push the piston 60 away from the housing 62 and toward the panel 18 to force the panel 18 to the extended position.

The vehicle 12 may include an impact sensing system (not shown). The impact sensing system may include an impact sensor and a controller. The controller is in communication with the actuator 16 and may include a processor and a memory. The memory stores instructions executable by the processor to control the actuator 16. The controller may be programmed to, upon identification of an impact, actuate the actuator 16, causing the actuator 16 to ignite the electrical ignition device and deploy the piston 60 into the panel 18.

The impact sensor may be in communication with the controller to communicate data to the controller. The impact sensor may use e.g., accelerometers, radar, lidar, and/or a vision system. The vision system may include one or more cameras, CCD image sensors, and/or CMOS image sensors, etc. Based on data communicated by the impact sensor, the controller may cause triggering of the actuator 16.

To facilitate communications, the controller, the impact sensor, the actuator 16, and other components in the vehicle 12 may be connected to a communication bus, such as a controller area network (CAN) bus, of the vehicle 12. The controller may use information from the communication bus to control the triggering of the actuator 16. The actuator 16 may be connected to the controller or may be connected to the communication bus.

In operation, the panel 18 is in a recessed position, as shown in FIGS. 2 and 4, under normal operating conditions of the vehicle 12. When the impact sensor senses a front pedestrian impact, the impact sensing system triggers communication to the controller identifying the impact. The controller may selectively instruct, e.g., based on the type of impact, the actuator 16 to deploy the panel 18 from the recessed position. When the actuator 16 deploys the panel 18 from the recessed position, the first bracket 20 and the second bracket 22 of the locking devices 36, 38 move relative to each other along the axis 52. The post 42 moves along the axis 52 until the post 42 reaches and extends into the notch 50. When the post 42 extends into the notch 50 in each locking device 36, 38, the locking devices 36, 38 are in the locked position to maintain the panel 18 in the extended position. When the panel 18 is in the extended position, the panel 18 aligns with the bumper 14 to form an enlarged impact surface that may reduce injury to the pedestrian's knee and ACL.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a bumper;
an actuator fixed to the bumper;
a panel fixed to the actuator and moveable relative to the bumper;
a first bracket fixed to one of the bumper and the panel;
a second bracket fixed to the other of the bumper and the panel and moveably engaged with the first bracket; and
a spring-loaded lock fixed to the first bracket and biased against the second bracket.

2. The system as set forth in claim 1, wherein the spring-loaded lock includes a spring fixed to the first bracket and a post between the spring and the second bracket, the post slideably contacting the second bracket.

3. The system as set forth in claim 2, wherein the spring is a leaf spring.

4. The system as set forth in claim 2, wherein the second bracket has a notch spaced from the post and sized to receive the post.

5. The system as set forth in claim 4, wherein the first bracket and the second bracket are moveable relative to each other along an axis, wherein the post and the notch are spaced from each other along the axis.

6. The system as set forth in claim 4, wherein the first bracket and the second bracket are moveable relative to each other to a locked position, the post extending into the notch and preventing relative movement between the first and second bracket when the first and second bracket are in the locked position.

7. The system as set forth in claim 1, wherein the second bracket has a notch spaced from the spring-loaded lock and sized to receive the spring-loaded lock.

8. The system as set forth in claim 7, wherein the first bracket and the second bracket are moveable relative to each other along an axis, wherein the spring-loaded lock and the notch are spaced from each other along the axis.

9. The system as set forth in claim 7, wherein the first bracket and the second bracket are moveable relative to each other to a locked position, the spring-loaded lock extending into the notch and preventing relative movement between the first and second bracket when the first and second bracket are in the locked position.

10. The system as set forth in claim 1, wherein one of the first bracket and the second bracket is tubular and slideably houses the other of the first bracket and the second bracket.

11. The system as set forth in claim 10, wherein the second bracket has a notch spaced from the spring-loaded lock and sized to receive the spring-loaded lock.

12. The system as set forth in claim 1, wherein each of the first bracket and the second bracket has a track, wherein each track receives each other.

13. The system as set forth in claim 1, wherein one of the first bracket and the second bracket has a slot that receives the other of the first bracket and the second bracket.

14. The system as set forth in claim 1, wherein the actuator is a pyrotechnic actuator.

15. The system as set forth in claim 1, wherein the actuator includes a piston and a housing that moveably receives the piston, the housing being fixed to one of the bumper and the panel and the piston being fixed to the other of the bumper and the panel.

16. The system as set forth in claim 1, further comprising a first locking device including the first bracket, the second bracket, and the spring-loaded lock, and further comprising a second locking device fixed to the bumper and the panel and spaced from the first locking device, and the actuator being between the first locking device and the second locking device.

17. The system as set forth in claim 16, wherein the second locking device is identical to the first locking device.

18. The system as set forth in claim 1, wherein the bumper and the panel each include a vehicle-outward face, and the vehicle-outward face of the panel is recessed relative to the vehicle-outward face of the bumper.

* * * * *